(12) United States Patent
Lecerf (10) Patent No.: US 7,830,746 B2
(45) Date of Patent: Nov. 9, 2010

(54) METHOD FOR TREATING SEISMIC DATA CORRESPONDING TO ACQUISITIONS OBTAINED FOR A COMMON ZONE BY MEANS OF UNDERWATER SEISMIC RECEIVERS AND BY MEANS OF SURFACE RECEIVERS

(75) Inventor: Didier Lecerf, Guilford Surrey (GB)

(73) Assignee: Cggveritas Services SA, Massy (FR)

( * ) Notice: Subject to any disclaimer, the term of this patent is extended or adjusted under 35 U.S.C. 154(b) by 263 days.

(21) Appl. No.: 10/554,798

(22) PCT Filed: Apr. 28, 2004

(86) PCT No.: PCT/FR2004/001025

§ 371 (c)(1),
(2), (4) Date: Apr. 25, 2006

(87) PCT Pub. No.: WO2004/097458

PCT Pub. Date: Nov. 11, 2004

(65) Prior Publication Data

US 2007/0041271 A1    Feb. 22, 2007

(30) Foreign Application Priority Data

Apr. 28, 2003    (FR)    ................................ 03 05160

(51) Int. Cl.
*G01V 1/00*    (2006.01)
(52) U.S. Cl. ........................................................ 367/45
(58) Field of Classification Search ............. 367/13–15, 367/20, 21, 24, 72, 153–154
See application file for complete search history.

(56) References Cited

U.S. PATENT DOCUMENTS

| | | | | |
|---|---|---|---|---|
| 6,131,071 A | * | 10/2000 | Partyka et al. | ................ 702/16 |
| 6,317,695 B1 | * | 11/2001 | Zhou et al. | .................... 702/17 |
| 6,704,244 B1 | * | 3/2004 | Vaage | ......................... 367/24 |
| 6,807,513 B2 | * | 10/2004 | Sandjivy | ..................... 702/182 |

OTHER PUBLICATIONS

Hall, "Time Lapse seismic monitoring of compaction and subsidence at Valhall through cross- matching and interpreted warping of 3D streamer and OBC data", SEG Int'l Exposition and 72nd annual meeting, Oct. 2002.*

(Continued)

*Primary Examiner*—Jack Keith
*Assistant Examiner*—Krystine Breier
(74) *Attorney, Agent, or Firm*—Fulbright & Jaworski, L.L.P.

(57) ABSTRACT

Method for processing seismic data sets corresponding to the same zone, some of which are acquired by means of receivers at the ocean bottom, while others are acquired by means of surface receivers, characterized in that at least one seismic data set that is an estimation of the component common to at least two seismic data sets corresponding respectively to one and to the other of these two acquisition modes is determined.

18 Claims, 6 Drawing Sheets

Common Cube

Cube (A- Common)
+ Noise A

Cube (Common - B)
+ Noise B

OTHER PUBLICATIONS

Hall, S.A. et al, "Time-Lapse Seismic Monitoring of Compaction and Subsidence at Vanhall . . .", SEG Int'l Exposition, Salt Lake City, UT, Oct. 6-11, 2002, XP002269229.

Rickett, J.E. et al, "Cross Equalization Data Processing for Time-Lapse Seismic . . .", Geophysics, vol. 66, No. 4, Jul.-Aug. 2001, pp. 1015-1025.

Ikelle, Luc T., "Combining Two Seismic Experiments to Attenuate Free-Surface Multiples in OBC Data", Geophysical Prospecting, 1999, pp. 179-193.

Coleou, T. et al, "Multivariate Geostatistical Filtering of Time-Lapse Seismic Data . . . ", SEG Int'l Exposition, Salt Lake City, UT, Oct. 6-11, 2002, XP002269218.

* cited by examiner

METHOD FOR TREATING SEISMIC DATA CORRESPONDING TO ACQUISITIONS OBTAINED FOR A COMMON ZONE BY MEANS OF UNDERWATER SEISMIC RECEIVERS AND BY MEANS OF SURFACE RECEIVERS

GENERAL FIELD AND PRIOR ART

This invention relates to the processing of seismic data, in particular amplitude or attribute cubes, from acquisitions obtained for the same zone by means of seismic receivers placed at the ocean bottom (OBC or Ocean Bottom Cable techniques) and by means of receivers placed at the surface (seismic cables towed by boats, for example).

The OBC techniques currently have many advantages.

They allow for wide azimuth ranges and the use of multiples suppression techniques and therefore provide high-quality images.

They also allow for good coverage of the zones to be explored.

In addition, they have the significant advantage of enabling repeatable and frequent acquisitions.

The OBC techniques are especially advantageous, in particular, but in a non-limiting manner, for monitoring and characterising reservoirs:

It is common in the field of seismics to identify geological or geophysical characteristics of a given zone by comparing seismic cubes in which the data are obtained, for one, from OBC acquisitions and, for the other, from acquisitions obtained using surface receivers.

However, given that this involves very distinct acquisition techniques, the matching between seismic data from acquisitions obtained with each of these two techniques is generally relatively poor.

Moreover, when the difference in terms of seismic signal is of low amplitude, the physical properties to be identified can easily be masked by artifacts such as, for example, the noise due to the imperfect seismic data acquisition geometry.

Figure 1:
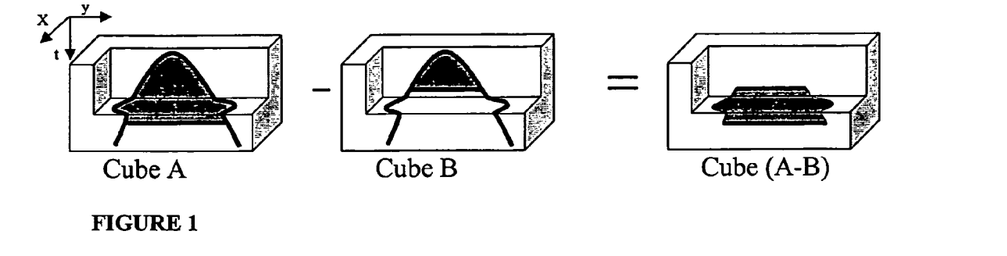
FIG. 1 is a diagrammatic view showing the imaging of geological or geophysical characteristics of a given zone by subtraction of cubes corresponding to data from OBC acquisitions and acquisitions by means of surface detectors.
Figure 2:
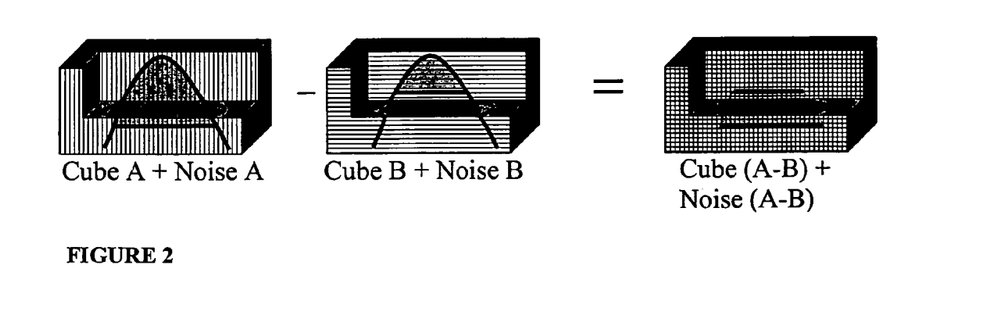
FIG. 2 is a diagrammatic view showing that the subtraction of noisy cubes only increases the level of noise with respect to the detected variations.

The random and unrepeatable nature of the noise of each acquisition means that, as shown in FIG. 2, the simple subtraction of the seismic data increases the noise level with respect to the signal sought. In FIG. 2, the noise is diagrammed with horizontal lines (cube A) and vertical lines (cube B) which overlap on the subtracted cube (cube A-B). In addition, the overlapping of the respective noises destroys their statistical spatial organisations (if they exist) and therefore makes it more difficult to filter them.

For this reason, the simple subtraction of seismic data from acquisitions obtained by OBC techniques and seismic data from acquisitions obtained using surface receptors does not normally enable the low-level residual signals to be shown.

DESCRIPTION OF THE INVENTION

The invention proposes a method for processing seismic data sets corresponding to the same zone, some acquired by means of receivers at the ocean bottom, others acquired by means of receivers at the surface, characterised in that at least one seismic data set is determined as an estimation of the component common to at least two seismic data sets corresponding respectively to one and the other of these two acquisition modes.

"Seismic data set" in this context and throughout this text refers to any data set associating seismic amplitude or attribute values with a plurality of points of the acquisition zone and at least one given time These seismic data sets are in particular, but in a non-limiting manner, seismic data cubes, i.e. collections of seismic data (amplitude or attribute) giving, for a plurality of points of the acquisition zone, a series of values taken successively in time by the amplitude or attribute in question.

It should be noted that the set which is an estimation of the component common to at least two seismic data sets corresponding respectively to one and the other of these two acquisition modes, has a better signal-noise ratio and resolution than the initial data sets.

It can be subtracted from these initial data sets.

In this way, differential data sets are determined without the noises of the two initial data sets overlapping.

And these differential data sets can easily be filtered since the statistical spatial organisation has not been destroyed by the overlapping of noises.

DESCRIPTION OF ONE OR MORE EMBODIMENTS

GENERAL EXAMPLE

Two seismic data cubes (data A and data B) from an OBC acquisition and from a surface acquisition by means of detectors of the seismic streamer type are considered.

This data can be seismic amplitudes or attributes.

A specific example is given at the end of the description.

These data cubes A and B can be broken down as follows:

data $A$=common part+noise $A$ data $B$=common part+noise $B+\Delta$ where $\Delta$ represents the seismic data variations and where the common part is defined as the coherent or invariant part of data A and B.

In a first step, an estimation of this common part is determined.

Various methods can be used to this end.

In particular, this estimation can be calculated by cokriging, by cross-correlation or by averaging.

This estimated common part represents redundant geological information and has the advantage of presenting a better signal-to-noise ratio than the initial data.

In a second step, the two following partial differences are determined:

Diff $A$=data $A$−estimated common part

Diff $B$=estimated common part−data $B$

Figure 3:
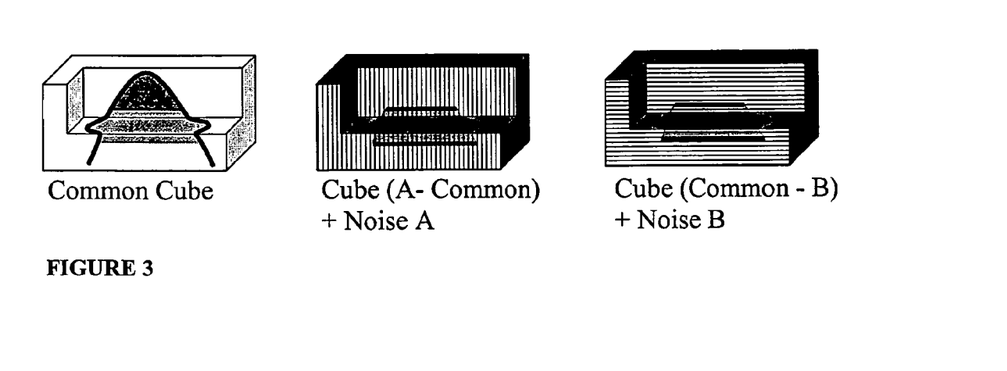
FIG. 3 is a diagrammatic view showing the determination of a common cube and the determination, from this common cube, of difference cubes.

FIG. 3 shows the common component cube and the partial difference cubes (differential cubes) thus obtained.

The two partial differences enable a part of the signature 4D to be shown.

They verify:

Diff $A$=noise $A-\alpha.\Delta$

Diff $B$=−noise $B-(1-\alpha)\Delta$

Where $\alpha$ is the ratio of distribution of the residual signal, which is often close to 0.5 but may vary spatially. (It may also be dependent on the signal-t-noise of each initial cube).

The signal-to-noise ratio of these two partial differences is thus $\alpha.\Delta$/noise A for Diff A and $(1-\alpha)\Delta$/noise B for Diff B.

Next, a filtering process is performed on the partial differences thus obtained, which is possible since the statistical spatial organisations are preserved and in particular have not been suppressed by the overlapping of noises, and the noise of each data set preserves its initial intrinsic properties, such as its statistical spatial coherence.

The filtering implemented is, for example, a deterministic spatial filter in the KxKy domain or a statistical filter by factorial kriging or even a smoothing function along a particular axis enabling the acquisition noises to be attenuated. The spatial orientation of the noise is easier to determine with statistical measurements (2D/3D variograms) given that the common part containing the majority of the seismic signal of the geological zone has been subtracted.

After filtering, it is possible to reconstruct the total difference from the two filtered partial differences thus obtained:

data $A$−data $B$=Diff $A$+Diff $B$

It is understood that the summing of the partial differences after filtering thereof provides a better signal-to-noise ratio than what is obtained by calculating the total difference by subtraction of data A and data B.

It is noted that there is no loss of information since the sum of the partial differences is equal to the total difference.

In addition, it is noted that if the noise level is different between the initial data A and B, one of the two partial differences has a better signal-to-noise ratio than the total difference.

In some cases, the information will be more apparent on a cube corresponding to a partial difference than on the cube corresponding to the total difference.

Example of Calculation of the Common Part

Principle

Figure 4:
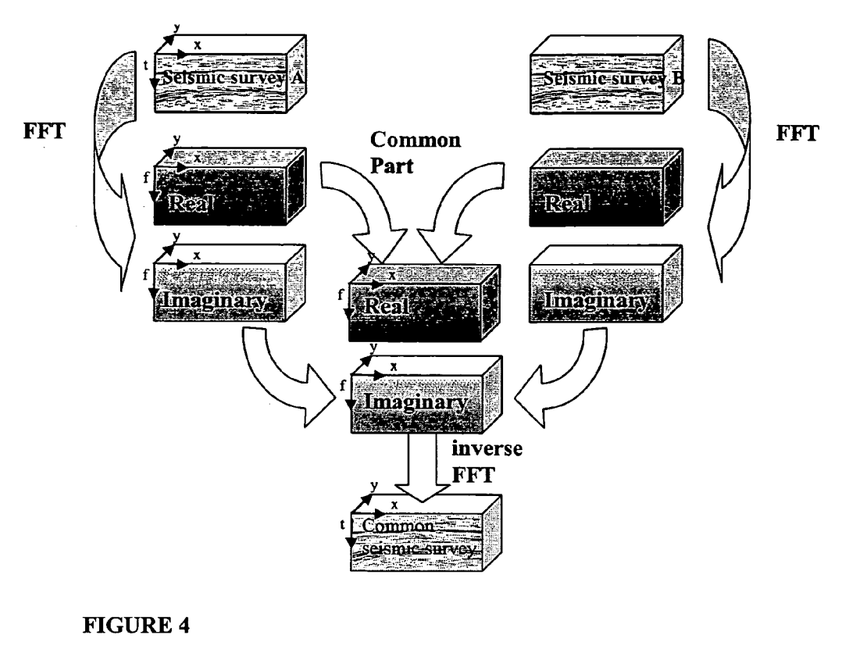
FIG. 4 shows a possible embodiment for determining an estimation of the part common to two seismic cubes.

FIG. 4 shows an example of a calculation of the common part using the automatic spatial factorial cokriging (or automatic multivariable kriging analysis) in the frequency domain.

The initial time data is transformed by FFT into cubes of real parts and imaginary parts in the frequency domain (Fourier domain).

The common part of each real and imaginary frequency plane is calculated by the so-called "automatic factorial cokriging" method with a 2D operator in the plane (x, y).

By the process of inverse Fourier transform of the common cube of the real parts and the common cube of the imaginary parts, the common time cube of the seismic data is thus obtained.

Detailed Example

A more detailed example of the processing is provided below:

1) In a first step, the data corresponding to the two collections of traces (cube A and cube B) to be processed is read. This data is recorded in a file in which each trace is identified by a line number and a column number that correspond to a ground position.

2) In a second step, a time window is selected in order to define on the seismic traces the time interval taken into consideration for the processing. As necessary, the portions of traces thus selected are completed with null values so as to obtain, for each trace, a number of samples corresponding to a power of 2, 3, 5 so as to enable the FFT processing according to the FFT functions.

3) In a third step, a fast Fourier transform (FFT) is applied to the series of samples corresponding to each of the traces and to the time window selected.

Thus, four cubes with a frequency corresponding to the real part and the imaginary part of each selection of cubes A and B are obtained.

4) For each frequency plane, two maps (2D), one corresponding to the cube A data and the other corresponding to the cube B data, are constructed in the real domain and in the imaginary domain.

Then, an automatic factorial cokriging processing operation is applied to the maps thus obtained for the data A and B cubes so as to obtain a map common to the two initial maps.

Summaries of the factorial cokriging are provided in Appendix I at the end of the description.

The factorial cokriging processing operation is performed independently with the real parts and with the imaginary parts.

This processing operation comprises, for example, in each of these two domains, the following steps:

According to a given variogram radius, the calculation of a 2D variogram for the map corresponding to data A and for the map corresponding to data B; calculation of a cross-variogram.

Construction of covariance and cross-covariance matrices based on the 3 variograms thus obtained.

Resolution of the factorial cokriging system which corresponds to these matrices, so as to deduce a spatial operator, i.e. according to the line and column position of the sample in question on the map. To stabilise the inversion of system matrix, a constant that corresponds to a very small percentage of the square root of the product of the two variances is added to the diagonal of the covariance matrices.

The spatial operator thus obtained with the initial maps is then convoluted to obtain the common part of the two maps.

5) The processing operation described above is repeated for each frequency plane of the real and imaginary parts. Two cubes are obtained, one for the common real parts and the other for the common imaginary parts.

6) Once all of the frequency planes have been calculated, an inverse Fourier transform of the common complex cubes is implemented in order to obtain a cube in common seismic time.

Example of the Results

Figure 5A:
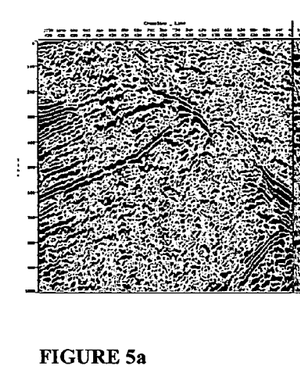
FIGS. 5a to 5c show an example of a result obtained by implementing the method shown in FIGS. 3 and 4.
Figure 5B:
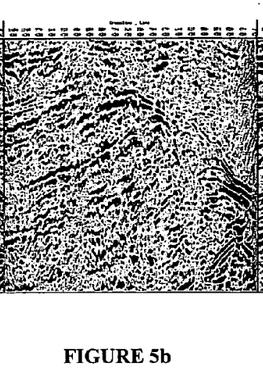
Figure 5C:
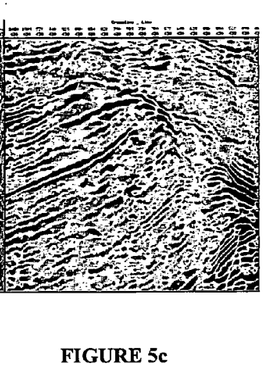

FIGS. 5a to 5c show results obtained with this type of processing.

FIGS. 5a and 5b respectively show maps of data obtained for the same zone from surface acquisitions (FIG. 5a) and from OBC acquisitions (FIG. 5b).

This data is in particular advantageously obtained by subjecting the collection of seismic traces corresponding to the surface acquisitions and to the OBC acquisitions to the same processing sequences.

For example, the collections of seismic traces obtained with one and the other of the two acquisition techniques are subjected to the following similar progressive processing sequences:
  band-pass filtering,
  exponential and global gain correction,
  deterministic phase resetting (using individual operators specific to each collection),
  3D DMO sum,
  white noise attenuation,
  etc.

In addition, the collections of traces corresponding to components P and Z of the OBC acquisitions are equalised as to level and summed to cause phantom waves and multiple reflections ("peg legs") to disappear.

The collections of traces corresponding to the surface acquisitions are processed by tau-p predictive deconvolution (multiple attenuation), then subjected to high-resolution Radon transform and deconvolution in the T-X domain (velocity filtering).

Also, given that the OBC data correspond to wider ranges as to azimuths and source-receiver offsets than the surface data, a selection is made, for each bin used to process the OBC data, of a minimum azimuth and an offset class to have for the OBC data an azimuth range similar to that of the surface data.

In addition, a resetting function is applied to the surface data and to the OBC data in order to have, for all of the data, the same source-receiver offset distribution.

FIG. 5c shows the common part of the maps of FIGS. 5a and 5b. This common part shows a better signal-to-noise ratio than the initial data. It is advantageously used as a reference. The total difference of the two sets of data A and B is broken down into two partial differences with respect to their common part and shows the geological signature (4D signature in the case of cubes).

Examples of Alternative Embodiments

Other embodiments can of course be considered.

Processing Mask

Figure 6:
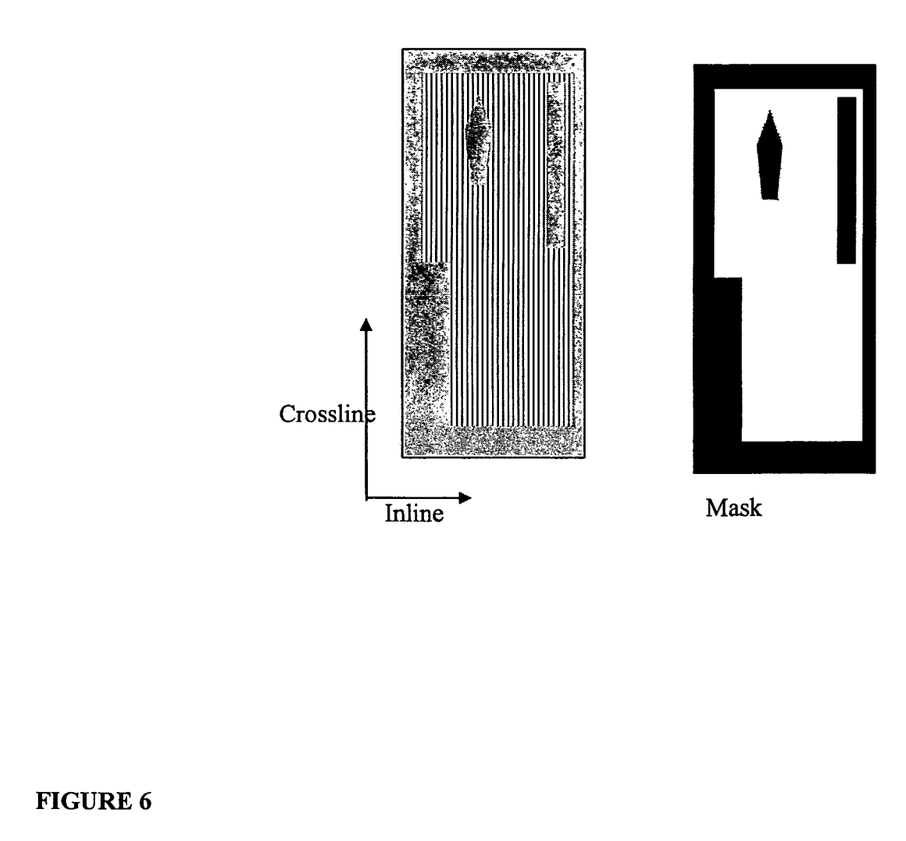
FIG. 6 shows an example of a mask applied to the 2D maps.

As shown in FIG. 6, the calculation of the operator can be limited to precise regions corresponding to valid data. The variograms and cross-variogram are thus calculated on the regions defined by the mask. The mask can, for example, hide a zone without data due to a drilling platform or data with significant noise due to edge effects. The use of a mask will improve the quality of the operator and therefore of the noise filtering. The mask is defined with valid values in white 1 and non-valid values in black 0.

Double Iteration

Figure 7:
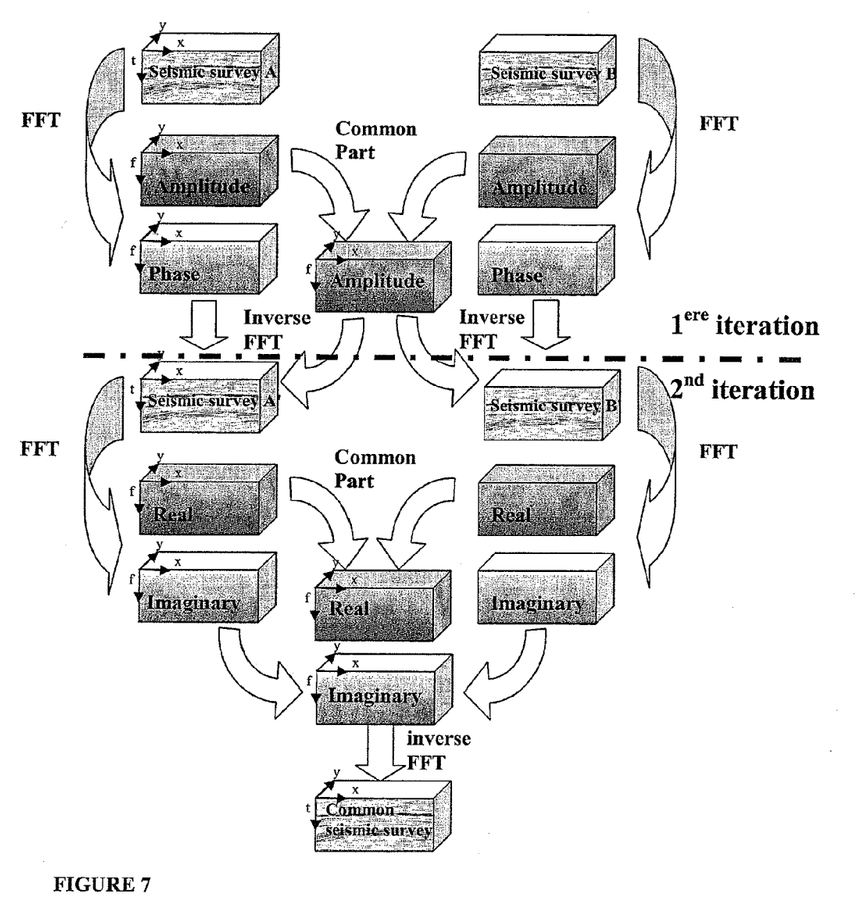
FIG. 7 shows another possible embodiment with a plurality of iterations.

In addition, when the frequency content of the signal between cubes A and B is very different, it is sometimes advantageous to perform the calculation of the common cube in two iterations: (FIG. 7).

The first iteration consists of calculating a common amplitude spectrum.

To this end, for each frequency plane, an amplitude map as well as a phase map are determined from maps of real and imaginary parts. Then, on the basis of the amplitude maps thus determined for the data A and the data B for each frequency, a common map of spectral amplitude is determined. This map is appropriately determined by automatic factorial cokriging.

The real and imaginary part of A and B is then reformulated with the common amplitude thus obtained and the initial phase of A and B. After an inverse FFT processing of the cubes, two seismic cubes A' and B' having the same frequency content are obtained.

These two cubes are then processed with a second iteration.

The second iteration calculates the common real and imaginary part of A' and B'. In fact, it will set the common phase of the two seismic cubes A' and B' since the amplitude spectrum is already common after the first iteration.

Next, the common part is determined as previously described in reference to FIG. 6.

Figure 8:
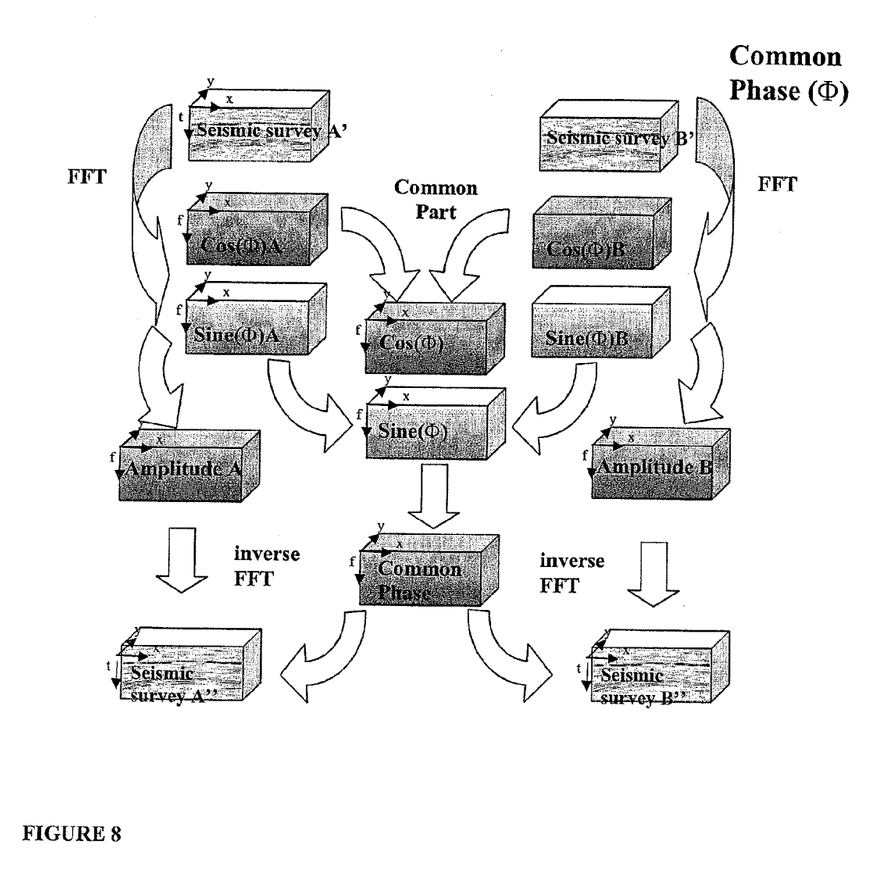
FIG. 8 shows another possible embodiment for calculating two cubes with a common phase.

Another possible alternative embodiment is shown in FIG. 8.

This alternative embodiment involves the extraction of cubes of amplitude associated respectively with cube A and cube B.

Simultaneously, or in a second step, the real and imaginary parts of cubes A and B, cubes corresponding to the cosine and the sine of the data phase, are shown.

Next, cubes of which one corresponds to the common part of the cosine cubes and the other corresponds to the common part of the sine cubes are determined.

Then, a cube of which the data constitutes the ratio of the sine cube and the cosine cube data thus obtained is determined: one thus has a cube giving the common part of the phase.

This common phase cube is combined with the two amplitude cubes initially extracted from cubes A and B so as to deduce the filtered cubes A' and B'.

These two cubes of filtered data can themselves be the subject of the second iteration described in reference to FIG. 5.

In another alternative, it is possible to calculate the cube common to data cubes A and B by combining the cube of the common phase part and the cube of the common amplitude part.

Processing Operations Other Than 2D Factorial Cokriging

Other processing operations for estimating the common part, and in particular processing operations implementing a factorial cokriging, can be considered.

In particular, it is possible to determine a common part directly in the time domain on a series of maps (x, y) of seismic amplitude (or other data).

For each time considered, the part common to the two mappings that correspond to this time is determined by implementing an automatic factorial cokriging processing operation.

In addition, the processing can use 3D operators instead of 2D operators. The automatic factorial cokriging processing operation is indeed generalised with a three-dimensional covariance matrix.

It should be noted that the use of 2D operators (x, y) (or 3D as necessary) makes this a very high-performing method for filtering spatially organised noises.

Of course, it is also possible to determine parts common to more than two cubes, by calculating, for example, common parts of common parts. In this way, the proposed method can be extended to more than two cubes.

Appendix I—Summary of Factorial Cokriging

An example of obtaining a common map by factorial cokriging is described below. Z1 and Z2 designate the two functions corresponding to these two maps.

A first step involves calculating the cross-variogram of these two functions, of which the values are:

$$\gamma_{12}(h) = \frac{1}{N}\sum (Z1(x) - Z1(x+h))(Z2(x) - Z2(x+h))$$

where x and x+h designate the pairs of points taken into consideration according to the direction and for the distance h for which the value of the variogram is determined, and where N is the number of these pairs of points for this direction and this distance.

Knowing this cross-variogram, it is possible then to determine an estimation of the function that corresponds to it, which verifies:

$$Z^*_{12}(x) = \Sigma \lambda_\alpha^1 Z_\alpha^1 + \Sigma \lambda_\beta^2 Z_\beta^2$$

where $\alpha$ and $\beta$ are two dummy indices designating the points considered around point x for which an estimation of said function is to be determined, with $Z_\alpha^1$ and $Z_\beta^2$ being the value of said point x, N being the number of these points and where $\lambda_\alpha^1$ and $\lambda_\beta^2$ are weighting coefficients.

These weighting coefficients $\lambda_\alpha^1$ and $\lambda_\beta^2$ are determined by inversion of the cokriging equation:

$$\begin{bmatrix} C_{11}11 & \cdots & C_{11}N1 & C_{12}11 & \cdots & C_{12}11 \\ \cdots & \cdots & \cdots & \cdots & \cdots & \cdots \\ C_{11}N1 & \cdots & C_{11}NN & C_{12}11 & \cdots & C_{12}NN \\ C_{21}11 & \cdots & C_{21}N1 & C_{22}11 & \cdots & C_{22}N1 \\ \cdots & \cdots & \cdots & \cdots & \cdots & \cdots \\ C_{21}1N & \cdots & C_{21}NN & C_{22}11 & \cdots & C_{22}NN \end{bmatrix} \begin{bmatrix} \lambda_{11} \\ \cdots \\ \lambda_{1N} \\ \lambda_{21} \\ \cdots \\ \lambda_{2N} \end{bmatrix} = \begin{bmatrix} C_{12}1X \\ \cdots \\ C_{12}NX \\ C_{12}1X \\ \cdots \\ C_{12}NX \end{bmatrix}$$

where the coefficients C12_ and C21_ are cross variance values of functions Z1 and Z2 at the points corresponding to indices $\alpha$ and $\beta$_ where the coefficients C11_ and C22_ are the covariance values respectively of function Z1 and function Z2 at said points. The index X corresponds to the point previously designated by x.

It is noted that the matrix that appears in this equation has the advantage of being inversible under certain calculation conditions.

In this way, by using the experimental covariances, the two variables corresponding to the two initial data series are broken down into a common component and two orthogonal residual components. The regularity of the data means that the experimental covariance is known for all of the distances used. No interpolation is necessary, and the matrix is defined as positive.

The function thus obtained is an estimation of the component common to the two data series constituted by the two mappings.

The invention claimed is:

1. A method for processing two seismic data cubes corresponding to a same subsurface zone, and respectively acquired by means of receivers at the ocean bottom and by means of surface receivers, said data cubes having amplitude or attribute values related to a plurality of points of said zone and at least one given time, wherein each data cube may be broken down into two component cubes, a noise cube and a common component cube, wherein said common component cube is determined as an estimate of a common component part of said seismic data cubes corresponding respectively to one and to the other of these two acquisition modes, said estimate of said common component being defined as the coherent or invariant part of said two seismic data cubes, the coherent or invariant part representing the redundant geological information of at least two of the seismic data cubes corresponding respectively to one and to the other of these two acquisition modes.

2. Method according to claim 1, characterised in that the seismic data set that is an estimation of the common component is subtracted from at least one of the two seismic data sets corresponding respectively to one and to the other of the two acquisition modes.

3. Method according to claim 1, characterised in that a filtering process is performed on a differential data set thus obtained.

4. Method according to claim 1, characterised in that the seismic data set which is an estimation of the common component is subtracted from the two seismic data sets corresponding respectively to one and to the other of the two acquisition modes, in that a filtering process is implemented on one and the other of the two differential sets thus obtained and in that these filtered differential sets are subtracted or summed to reconstruct an estimation of the difference between the initial data sets.

5. Method according to claim 1, characterised in that the data sets are seismic amplitude and/or attribute cubes.

6. Method according to claim 5, characterised in that, to determine a cube which is an estimation of a component common to at least two seismic data cubes:
   each of these two seismic data cubes is converted in the frequency domain to obtain for each of them a real cube and an imaginary cube,
   a cube that is an estimation, of the component common to the real cubes thus obtained, and a cube that is an estimation of the component common to the two imaginary cubes thus obtained are calculated, and
   the two estimated cubes thus obtained, one real and one imaginary, are converted in the time domain.

7. Method according to claim 5, characterised in that, in order to determine a cube that is an estimation of a component common to at least two seismic data cubes:
   each of these two seismic data cubes is converted to the frequency domain so as to deduce for each of them an amplitude and a phase cube,
   an estimation of the part common to the amplitude cubes thus obtained is calculated.

8. Method according to claim 7, characterised in that:
   in the frequency domain, the amplitude cube thus obtained is converted by associating it respectively with the different phase cubes,
   in the frequency domain, each of the cubes thus obtained in the time domain is converted so as to obtain, for each of the cubes thus obtained in the time domain, a real cube and an imaginary cube,
   a cube that is an estimation of the component common to the real cubes and a cube that is an estimation of the component common to the imaginary cubes is calculated, and
   in the time domain, the two estimated cubes thus obtained, one real and the other imaginary, are converted.

9. Method according to claim 5, characterised in that, in order to determine a cube that is an estimation of a component common to at least two seismic data cubes:
- each of these seismic data cubes is converted in the frequency domain so as to deduce, for each of them, an amplitude cube, as well as a cube corresponding to its real part and a cube corresponding to its imaginary part,
- cubes corresponding to the real part and cubes corresponding to the imaginary part are extracted from the cosine and sine cubes,
- an estimation of the part common to the cosine cubes and an estimation of the sine cubes are calculated,
- a common phase data cube is deduced from the cubes of common parts thus calculated.

10. Method according to claim 9, characterised in that:
- in the frequency domain, each of the cubes thus obtained in the time domain is converted so as to obtain for each of these cubes thus obtained in the time domain a real cube and an imaginary cube,
- a cube that is an estimation of the component common to the real cubes and a cube that is an estimation of the component common to the imaginary cubes are calculated, and
- in the time domain, the two estimated cubes thus obtained, one real and one imaginary, are converted.

11. Method according to claim 6, characterised in that, in order to calculate a cube that is an estimation of a component common to at least two seismic data cubes, a factorial cokriging processing operation is implemented.

12. Method according to claim 11, characterised in that, in order to calculate a cube that is an estimation of a component that is common to at least two seismic data cubes:
- each of these seismic data cubes is sampled so as to deduce, for each of them, a series of 2D maps,
- for each pair of 2D maps thus obtained, covariance and cross-variance matrices are determined, corresponding to the variograms of one and the other of these two maps, as well as to their cross-variogram,
- a factorial cokriging a system that corresponds to these matrices is resolved so as to deduce a spatial operator to be applied to the two 2D maps that correspond to them, so as to deduce a 2D map that corresponds to their common component, wherein all of the 2D maps thus obtained enable the common seismic cube to be reconstructed.

13. Method according to claim 12, characterised in that, in order to determine the cokriging system to he solved in order to deduce the spatial operator to be applied to two 2D maps, a mask is applied to the data of at least one of the two maps, prior to the determination of the covariances and cross-variances, which mask is intended to cancel the data of said map over a certain area.

14. Method according to claim 1, characterised in that the two sets of seismic data for which an estimation of the common component is determined are obtained by implementing similar propessive processing sequences on one or more collections of seismic traces acquired by means of receivers at the ocean bottom, and on one or more collections of seismic traces acquired by means of surface receivers.

15. Method according to claim 10, characterised in that the data are post-stack data.

16. Method according to claim 15, characterised in that the method includes processing sequences comprising the following steps:
- pass-band filtering,
- exponential and global gain correction,
- deterministic phase resetting (using individual operators specific to each collection),
- DMO sum,
- white noise attenuation.

17. Method according to claim 1, characterised in that the processing sequences comprise at least one step of multiple suppression or attenuation.

18. The method according to claim 1, wherein the follow-up and/or characterisation of geological or geophysical characteristics on hydrocarbon reservoirs, involves the implementation of seismic acquisitions by means of seismic receivers at the ocean bottom, as well as seismic acquisitions by means of surface receivers, and the processing of seismic data sets corresponding to these acquisitions.

* * * * *

UNITED STATES PATENT AND TRADEMARK OFFICE
CERTIFICATE OF CORRECTION

| | | |
|---|---|---|
| PATENT NO. | : 7,830,746 B2 | Page 1 of 1 |
| APPLICATION NO. | : 10/554798 | |
| DATED | : November 9, 2010 | |
| INVENTOR(S) | : Didier Lecerf | |

It is certified that error appears in the above-identified patent and that said Letters Patent is hereby corrected as shown below:

In claim 9, column 9, line 14, delete "parts" and insert --part-- therefor.
In claim 12, column 9, line 39, delete "cokriging a system" and insert --cokriging system-- therefor.
In claim 13, column 10, line 6, delete "to he" and insert --to be-- therefor.
In claim 14, column 10, line 15, delete "propessive" and insert --progressive-- therefor.
In claim 18, column 10, line 35, delete "reservoirs" and insert --reservoir-- therefor.

Signed and Sealed this
Fifteenth Day of February, 2011

David J. Kappos
*Director of the United States Patent and Trademark Office*